United States Patent
Murata

[11] Patent Number: 5,871,073
[45] Date of Patent: Feb. 16, 1999

[54] WET TYPE FRICTIONAL ENGAGEMENT DEVICE

[75] Inventor: Kiyohito Murata, Susono, Japan

[73] Assignee: Toyota Jidosha Kabushiki Kaisha, Toyota, Japan

[21] Appl. No.: 745,922

[22] Filed: Nov. 8, 1996

[30] Foreign Application Priority Data

Nov. 10, 1995 [JP] Japan ................................. 7-293055

[51] Int. Cl.⁶ .................................................. F16D 25/00
[52] U.S. Cl. ........................................... 192/86; 192/91 A
[58] Field of Search ........................ 192/91 A, 3.29, 192/3.33, 86

[56] References Cited

U.S. PATENT DOCUMENTS

| | | | |
|---|---|---|---|
| 2,442,840 | 6/1948 | Carnagua | 192/3.29 X |
| 2,920,728 | 1/1960 | Forster | 192/3.29 |
| 3,011,607 | 12/1961 | Englander . | |
| 3,209,874 | 10/1965 | Foster . | |
| 3,378,118 | 4/1968 | Maurice | 192/86 X |
| 3,924,717 | 12/1975 | Ookubo et al. | 192/86 |
| 4,091,899 | 5/1978 | Stevenson . | |
| 4,382,496 | 5/1983 | Yamamori et al. | 192/3.29 |
| 4,735,297 | 4/1988 | Koshimo | 192/3.29 |
| 4,974,710 | 12/1990 | Murasugi . | |
| 4,986,398 | 1/1991 | Olsen | 192/91 A |
| 5,086,894 | 2/1992 | Iizuka et al. | 192/3.29 |
| 5,339,935 | 8/1994 | Ishii et al. | 192/3.3 |
| 5,407,041 | 4/1995 | Fukunaga et al. | 192/3.29 |
| 5,456,343 | 10/1995 | Murata et al. . | |

FOREIGN PATENT DOCUMENTS

| | | |
|---|---|---|
| 2 356 052 | 1/1978 | France . |
| 896009 | 11/1953 | Germany . |
| 1 017 189 | 1/1966 | United Kingdom . |

OTHER PUBLICATIONS

Toyota Crown, New Car Features, Oct. 1991.
Toyota Crown, Repair Manual for Chassis & Body, Oct. 1991.

Primary Examiner—Rodney H. Bonck
Attorney, Agent, or Firm—Oblon, Spivak, McClelland, Maier & Neustadt, P.C.

[57] ABSTRACT

A wet type frictional engagement device includes a hydraulic fluid feed device for feeding hydraulic fluid between a pair of friction plates which are frictionally engaged with each other by a pushing element. By feeding hydraulic fluid between the pair of friction plates the distance between those plates are changed and thereby the transmission of power is controlled.

8 Claims, 8 Drawing Sheets

WET TYPE FRICTIONAL ENGAGEMENT DEVICE

BACKGROUND OF THE INVENTION

1. Field of the Invention

The present invention relates to a wet type frictional engagement device.

2. Description of the Related Art

As a wet type frictional engagement device, a lockup clutch of a torque converter and a clutch or a brake to engage, disengage or lock a component of an automatic transmission are known.

However, in the above conventional wet type frictional engagement devices, only one of a pair of friction plates which are frictionally engaged with each other in a case filled with oil is pushed against the other friction plate by a predetermined force, and no oil is forcibly fed between the friction plates.

Accordingly, in the engagement or semi-engagement of the conventional frictional engagement device, a sufficient quantity of oil is not fed between the friction surfaces. As a result, a film of oil of an appropriate thickness can not be stably formed on the friction surfaces, and a friction coefficient between the friction surfaces is apt to change. Therefore, especially in a state of semi-engagement, what is called "judder" is caused in the clutch, and it becomes impossible to operated the clutch smoothly.

SUMMARY OF THE INVENTION

An object of the present invention is to provide a wet type frictional engagement device in which the thickness of a film of oil formed between the friction plates can be most appropriately controlled and no judder is caused even in a semi-engagement state.

According to the present invention, there is provided a wet type frictional engagement device comprising; a first member connected to a power generating means; a second member arranged on the same axis as that of the first member, rotatable relative to the first member; a pair of friction plates respectively connected to the above two members, arranged so that the pair of friction plates can be frictionally engaged with each other; a pushing means for pushing at least one of the pair of friction plates against the other so that the pair of friction plates can be frictionally engaged with each other; and a hydraulic fluid feed means for feeding hydraulic fluid between the pair of friction plates frictionally engaged with each other by the pushing means, so as to change the distance between the pair of friction plates and thereby control transmission of power.

The present invention may be more fully understood from the description of the preferred embodiments of the invention set forth below, together with the accompanying drawings.

DESCRIPTION OF THE PREFERRED EMBODIMENTS

Referring to the accompanying drawings, the first embodiment of the present invention will be explained below.

Figure 1:
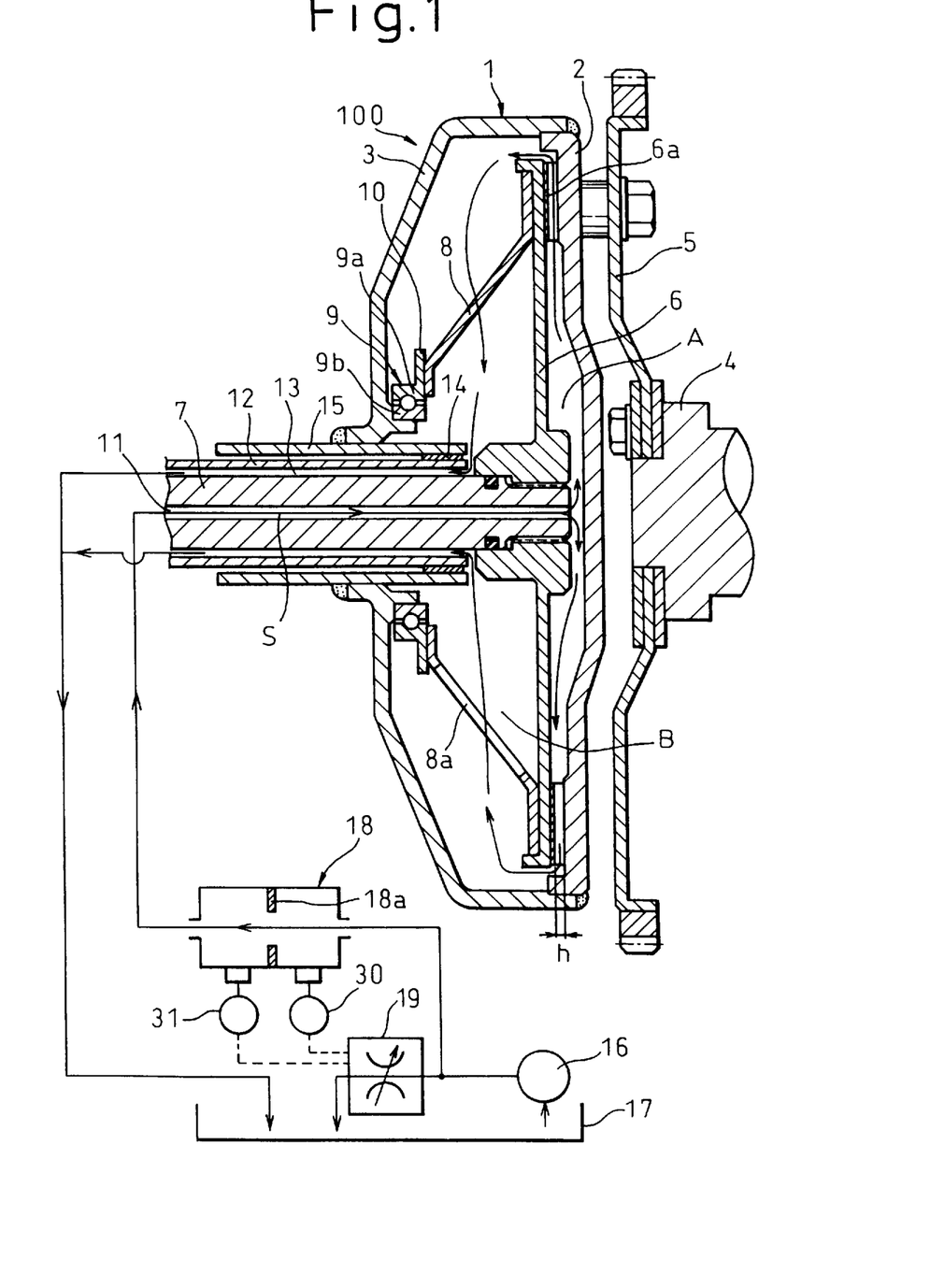
FIG. 1 is a view showing a construction of the wet type frictional engagement device of the first embodiment.

Reference numeral 100 denotes an overall arrangement of the first embodiment of the wet type frictional engagement device of the present invention. This wet type frictional engagement device is used for an automobile. Therefore, this wet type frictional engagement device is arranged between an engine (not shown) disposed in the right portion of the drawing and a transmission (not shown) disposed in the left portion of the drawing. Therefore, the right is defined as a front side, and the left is defined as a rear side in this specification, hereinafter.

Reference numeral 1 is a shell member, which is composed of a front cover 2 and a rear cover 3 which are connected by means of welding. The front cover 2 is connected to an input shaft 4 via an input plate 5. The input shaft 4 is connected to a crank shaft of the engine (not shown) in a portion not shown in the drawing.

Reference numeral 6 is a clutch disk, and the circumferential end portion on the inner diameter side is connected to an output shaft 7 by means of a spline connection. A friction member 6a is attached onto the outer circumferential side of the clutch disk 6 which faces the front cover 2.

Reference numeral 8 is a diaphragm type spring. As shown in the drawing, the outer circumferential side of the diaphragm type spring 8 extends to the front side and comes into contact with the clutch disk 6, and the inner circumferential side of the diaphragm type spring 8 extends to the rear side and comes into contact with the disk portion 10 formed integrally with the outer race 9a of the bearing 9. In this connection, it is possible to form the disk portion 10 separately from the outer race 9a of the bearing 9. The inner race 9b of the bearing 9 is connected to the rear cover 3 of the shell member 1.

Due to the above arrangement, the clutch disk 6 is pushed by the spring 8 toward the front cover 2 at all times. In order to accomplish a predetermined engagement relation between the clutch disk 6 and the front cover 2 by applying a force to overcome the above pushing force, hydraulic fluid is fed into the hydraulic fluid chamber A formed between the clutch disk 6 and the front cover 2.

In order to feed hydraulic fluid, there is provided a first hydraulic fluid passage 11 at a center of the output shaft 7, and also there is provided a second hydraulic fluid passage 13 between the output shaft 7 and the intermediate shaft 12 arranged outside the output shaft 7.

Between an end portion on the outer circumferential side of the clutch disk 6 and the shell member 1, there is provided a clearance, and there is provided a hole 8a in the spring 8. Accordingly, after hydraulic fluid has been fed into the hydraulic fluid chamber A, it passes through the hydraulic fluid chamber B defined by the spring 8 and the clutch disk 6. Then the hydraulic fluid is discharged outside the wet type clutch via the second hydraulic fluid passage 13.

In this connection, outside the intermediate shaft 12, there is provided an outer sleeve 15 via a bush 14. The outer sleeve 15 is welded to the rear cover 3 of the shell member 1.

Then, the hydraulic pump 16 sucks the hydraulic fluid that has returned into the oil pan 17, and feeds the hydraulic fluid into the hydraulic fluid passage 11. In the middle of the hydraulic fluid passage 11, there is provided a flow meter 18. A variable aperture 19 is adjusted so that a flow rate measured by the flow meter 18 can be an appropriate value to obtain a predetermined engaging condition. In this connection, the flow meter 18 is a differential type flow meter, at the center of which an orifice 18 is arranged, and there are provided a pressure gauge 30 to detect the pressure Pu in the upstream of the flow meter and a pressure gauge 31 to detect the pressure Pd in the downstream. Pressure signals detected by the pressure gauges 30, 31 are respectively sent to the variable aperture 19.

In this connection, after the hydraulic fluid has been fed by the hydraulic pump 16, it flows in the passage S indicated by an arrow in the drawing.

Figure 2:
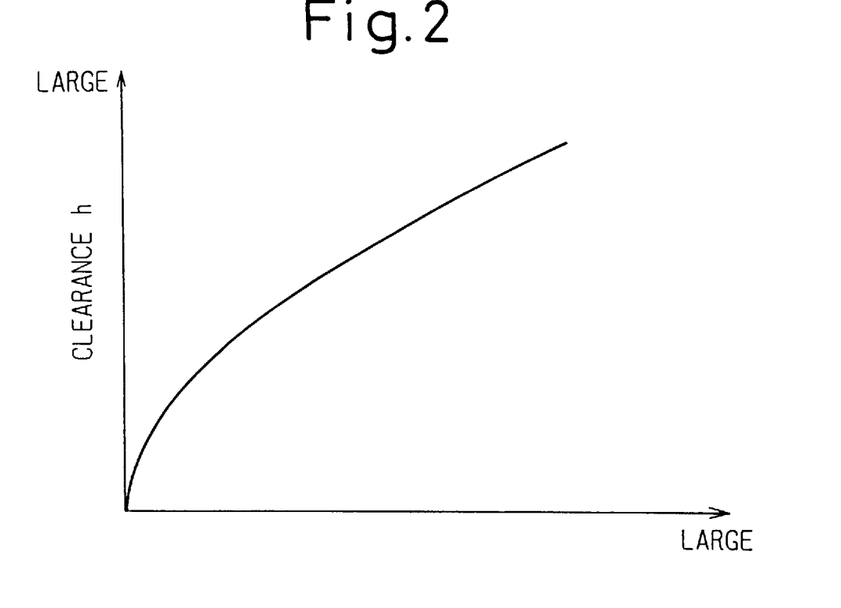
FIG. 2 is a diagram showing a relation between a flow rate of hydraulic fluid fed between the friction surfaces, and a clearance formed between the friction surfaces.

As shown in FIG. 2, in which a relation between the clearance "h" on the friction surface and the flow rate Q is shown, the clearance "h" is increased as the flow rate Q is increased.

The shearing force $\tau$ per unit area of the friction surface can be expressed by the expression of $\tau = \mu \cdot du/dy$, wherein $\mu$=coefficient of viscosity, du=relative velocity and dy =h=clearance.

Figure 3:
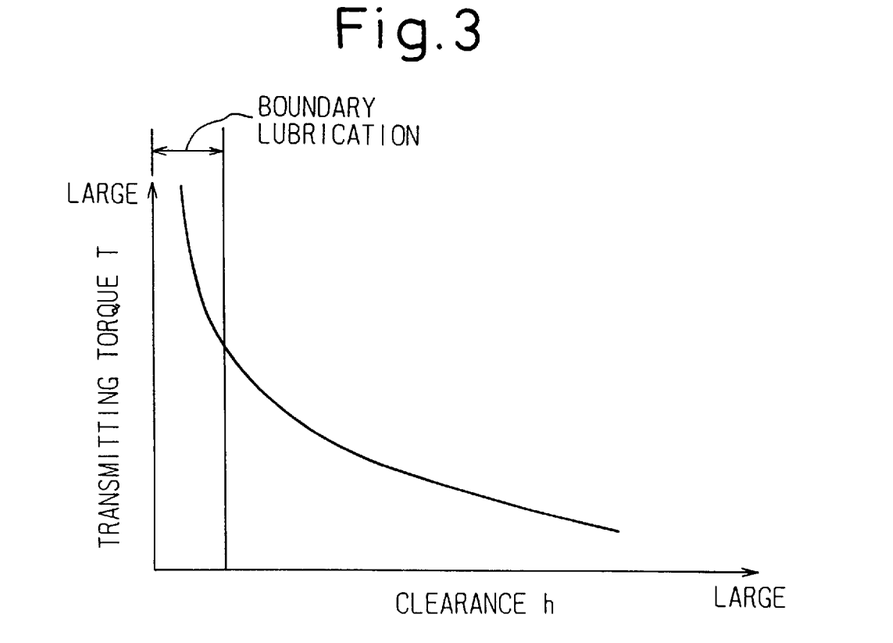
FIG. 3 is a diagram showing a relation between a clearance formed between the friction surfaces, and a torque to be transmitted.

In this case, $\tau$ is proportional to the torque T. Accordingly, the expression T=k·1/h is established, wherein "k" is a coefficient. Accordingly, a relation between the torque T and the clearance "h" can be expressed as shown in FIG. 3.

Consequently, in order to obtain a state in which the clutch is turned off, the flow rate Q may be increased so that a sufficiently large quantity of hydraulic fluid can be made to flow, and the clearance "h" may be increased so that the transmission torque T can be reduced. In the above condition, a quantity of hydraulic fluid is sufficiently large, so that fluid lubrication can be conducted on the friction surface and generated heat can be quickly removed. Therefore, it is possible to avoid the occurrence of a high temperature portion on the friction surface.

When the flow rate Q is reduced, the clearance "h" is also reduced, however, the state of fluid lubrication can be maintained. Accordingly, there is no possibility of the occurrence of judder of the clutch. According to the prior art, the pressure of a film of oil is low in the above case, so that a sufficiently large quantity of hydraulic fluid can not be fed onto the friction plate. Therefore, the lubricating condition at the friction surface is changed into a boundary lubrication, which could be a cause of judder in the clutch.

When the flow rate Q is further reduced so as to reduce a pressure difference $\Delta PAB$, which is not directly measured, between the hydraulic fluid chambers A and B, the thrust FP generated by this pressure difference $\Delta PAB$ becomes smaller than the pushing force FK of the spring. Then, the friction member 6a attached onto the clutch disk 6 is closely contacted with the inner surface of the front cover 2, and the clutch can be turned on. Since the pressure difference $\Delta PAB$ exists in the frictional engaging portion even in this case, a predetermined quantity of hydraulic fluid flows on the disk.

In this case, the surface pressure PD on the disk is expressed by the following expression.

$$PD = (FK - FP)/\{(\pi/4) \cdot (D2^2 - D1^2)\}$$

where D1 is an inner diameter of the frictional member and D2 is an outer diameter of the frictional member.

When the pressure in the hydraulic fluid chamber A is further reduced, the value PD is increased. Therefore, a sufficiently high transmission torque can be maintained even when a speed difference du in the relative rotation is reduced.

Figure 4:
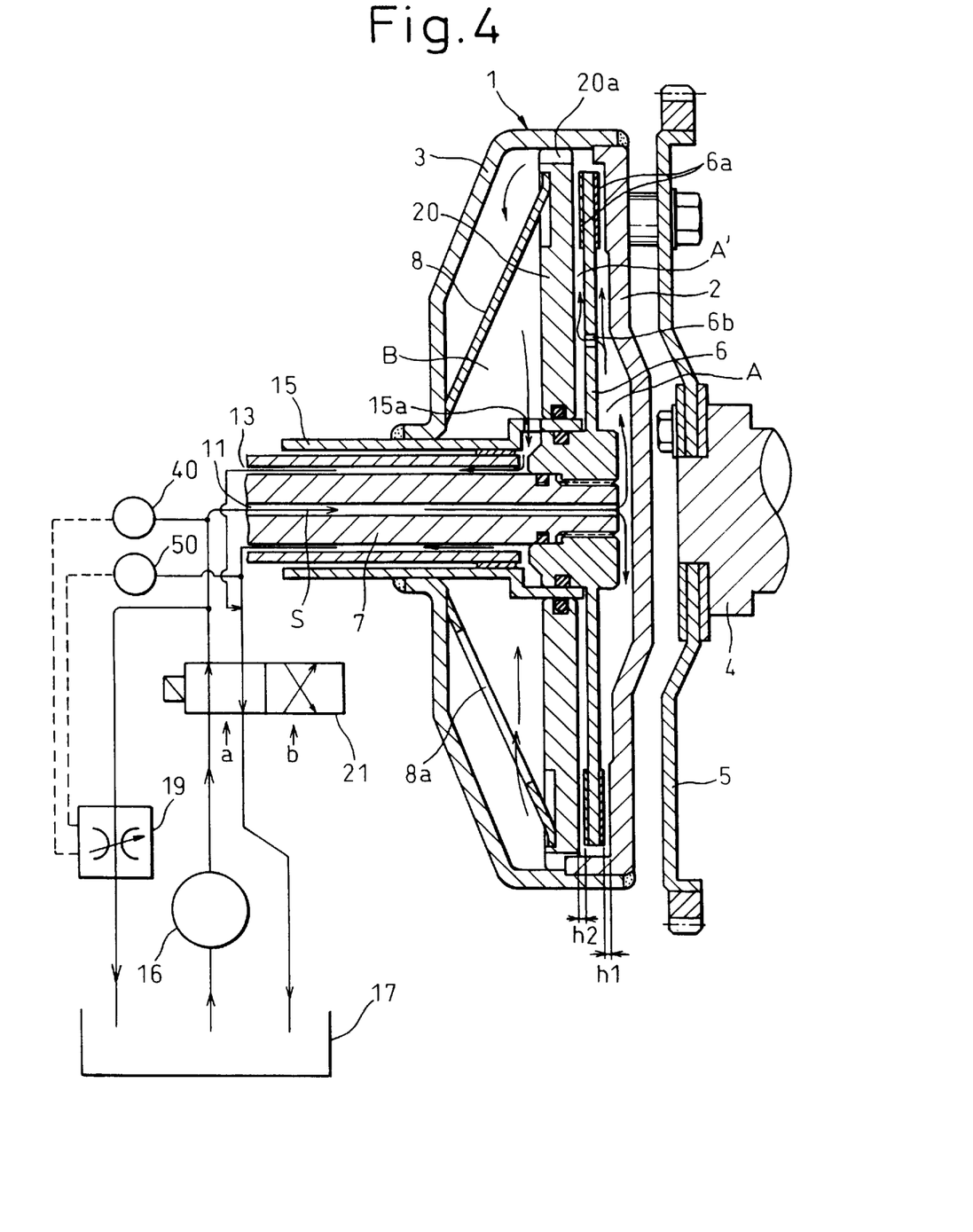
FIG. 4 is a view showing a construction of the second embodiment.

FIG. 4 is a view showing the construction of the second embodiment of the present invention. Between the clutch disk 6 and the spring 8, there is provided a piston 20 capable of moving in the axial direction. The clutch disk 6 is pushed toward the front cover 2 by the action of the spring 8 via the piston 20.

Friction members 6a are attached onto both sides of the clutch disk 6, and a hole 6b is formed on the inner diameter side of the clutch disk 6. As a result, an area of the friction surface of the friction member of the second embodiment can be increased to twice as large as that of the friction surface of the first embodiment described before. Further, it is possible to double the heat capacity of the friction members.

In this connection, in this embodiment, it is unnecessary to provide a bearing 9 which is used in the first embodiment. Therefore, the bearing 9 is removed from the arrangement of this embodiment.

Figure 5:
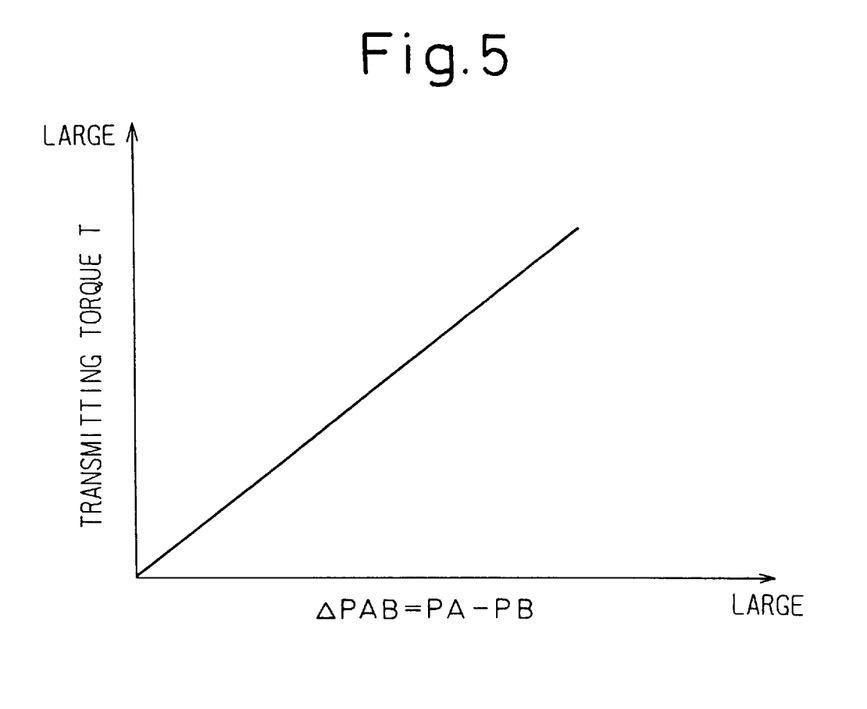
FIG. 5 is a diagram showing a relation between a difference in hydraulic fluid pressure between the hydraulic fluid chambers A and B, and a torque to be transmitted.

A relation between the pressure difference $\Delta PAB$ and the transmission torque T is previously found as shown in FIG. 5, wherein $\Delta PAB$ is a pressure difference between the hydraulic pressure PA in the hydraulic pressure chamber A and the hydraulic pressure PB in the hydraulic pressure chamber B. Then, the variable aperture 19 is adjusted so that a predetermined intensity of torque can be obtained. Therefore, the pressure gauge 40 is attached to the hydraulic fluid passage 11 communicated with the hydraulic fluid chamber A, and the pressure gauge 50 is attached to the hydraulic fluid passage 13 communicated with the hydraulic fluid chamber B.

In this connection, reference numeral 21 is a changeover valve to change over the hydraulic fluid passage. When the changeover valve 21 is set at a position "a", in the same manner as that of the first embodiment, hydraulic fluid flows from the hydraulic fluid passage 11 into the hydraulic fluid chambers A and A'. Then it flows into the hydraulic fluid chamber B via the clearance 20a formed on the outer circumference of the piston 20. Accordingly, in the same manner as that of the first embodiment, it is possible to engage and disengage the clutch, and it is also possible to provide a state of semi-engagement of the clutch. When the changeover valve 21 is set at a position "b", hydraulic fluid flows from the hydraulic fluid passage 13 into the hydraulic fluid chamber B. Then it flows into the hydraulic fluid chambers A and A' via the clearance 20a formed on the outer circumference of the piston 20. Therefore, the pressure in the hydraulic fluid chamber B can be increased higher than the pressure in the hydraulic fluid chambers A and A'. Accordingly, it is possible to increase the amount of torque to be transmitted.

In this connection, in the outer sleeve 15, there is formed a hole 15a to communicate the hydraulic fluid chamber B with the hydraulic fluid passage 13.

In this case, the clearance formed on one friction surface is defined as h1, and the clearance formed on the other friction surface is defined as h2. Since the hole 6b is formed on the inner diameter side of the clutch disk 6, in the case of h1<h2, the hydraulic pressure Ph1 on the h1 side becomes higher than the hydraulic pressure Ph2 on the h2 side. That is, Ph1>Ph2. As a result, there is a tendency that h1 is increased. Accordingly, h1 and h2 automatically satisfy the expression h1≅h2.

Figure 6:
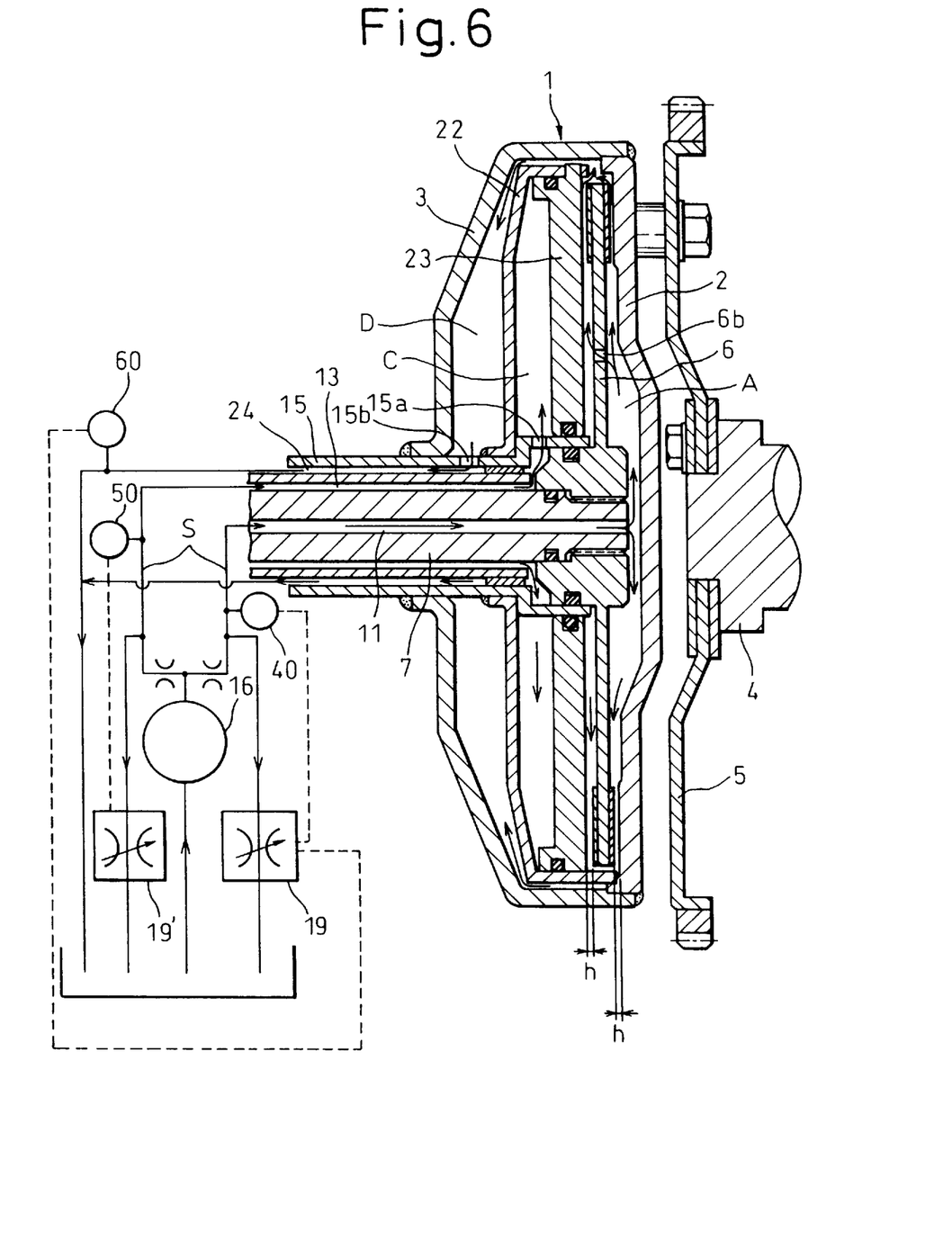
FIG. 6 is a view showing a construction of the third embodiment.

FIG. 6 is a view showing a construction of the third embodiment. In this embodiment, the clutch disk 6 is not frictionally engaged with the front cover 2 by a spring force but frictionally engaged with the front cover 2 by hydraulic pressure.

Therefore, the outer sleeve 15 is welded to the inner shell 22, and there is provided a piston 23 capable of sliding on an inner surface of the annular cylinder portion formed by the inner shell 22 and the outer sleeve 15. In this way, a hydraulic fluid chamber C is defined by the inner shell 22, piston 23 and outer sleeve 15. This hydraulic fluid chamber C is communicated with the hydraulic fluid passage 13 via the hole 15a in the same manner as that of the second embodiment. Due to the above construction, hydraulic fluid is fed from the hydraulic fluid pump 16 to the hydraulic fluid chamber C via the hydraulic fluid passage 13.

Therefore, an outlet of the hydraulic pressure pump 16 forks off into two branches and also communicates with the hydraulic fluid passage 13. In order to control its flow rate, a variable aperture 19' is added to the hydraulic circuit.

In the same manner as that of the first embodiment, hydraulic fluid is fed from the hydraulic fluid passage 11 into the hydraulic fluid chamber A. This hydraulic fluid flows in a clearance formed between the outer circumferential portion of the inner shell 22 and the shell member 1. Then it flows into the hydraulic fluid chamber D formed between the shell member 1 and the inner shell 22. Further, the hydraulic fluid flows into the hole 15b formed in the outer sleeve 15 and passes in the hydraulic fluid passage 24 formed between the outer sleeve 15 and the intermediate shaft 12 and discharges toward the oil pan 17.

Figure 7:
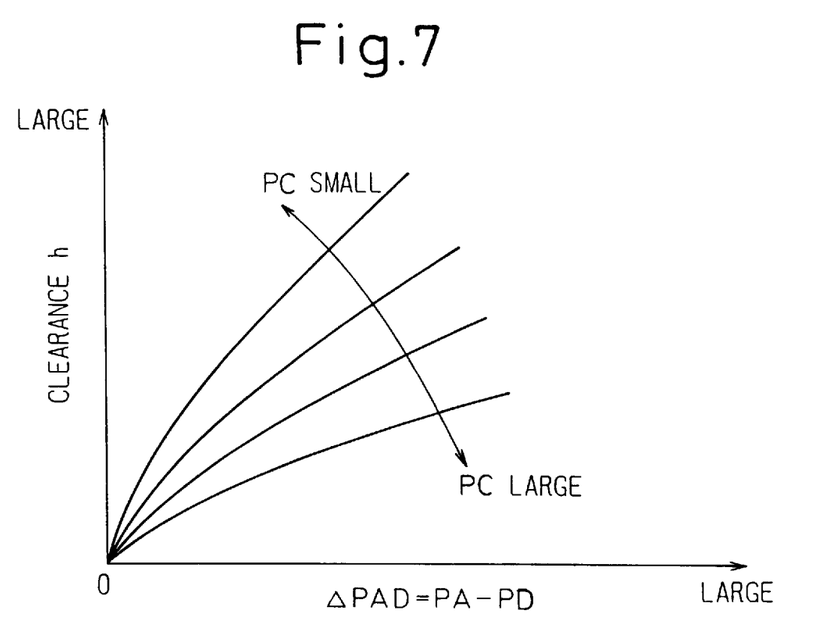
FIG. 7 is a diagram showing a relation between a difference in hydraulic fluid pressure between the hydraulic fluid chambers A and D, and a torque to be transmitted.

Due to the above construction, the clearance "h" formed between the clutch disk 6 and the front cover 2 is changed by the hydraulic pressure PC in the hydraulic pressure chamber C even if the difference ΔPAD between the hydraulic pressure PA in the hydraulic pressure chamber A and the hydraulic pressure PD in the hydraulic pressure chamber D is kept constant. That is, the clearance "h" is changed as shown in FIG. 7.

On the contrary, in order to obtain the same clearance "h", when the value of PC is high, ΔPAD is increased, and when the value of PC is low, ΔPAD is decreased.

In other words, since an intensity of motive power to be transmitted is determined by controlling the clearance "h", a load on the hydraulic pump can be reduced by reducing PC and ΔPAD.

For this reason, not only the pressure gauge 40 to measure the pressure in the hydraulic fluid passage 11 communicated with the hydraulic fluid chamber A and the pressure gauge 50 to measure the pressure in the hydraulic fluid passage 13 communicated with the hydraulic fluid chamber C are provided, but also the pressure gauge 60 to measure the pressure in the hydraulic fluid passage 24 communicated with the hydraulic fluid chamber D is provided.

Figure 8:
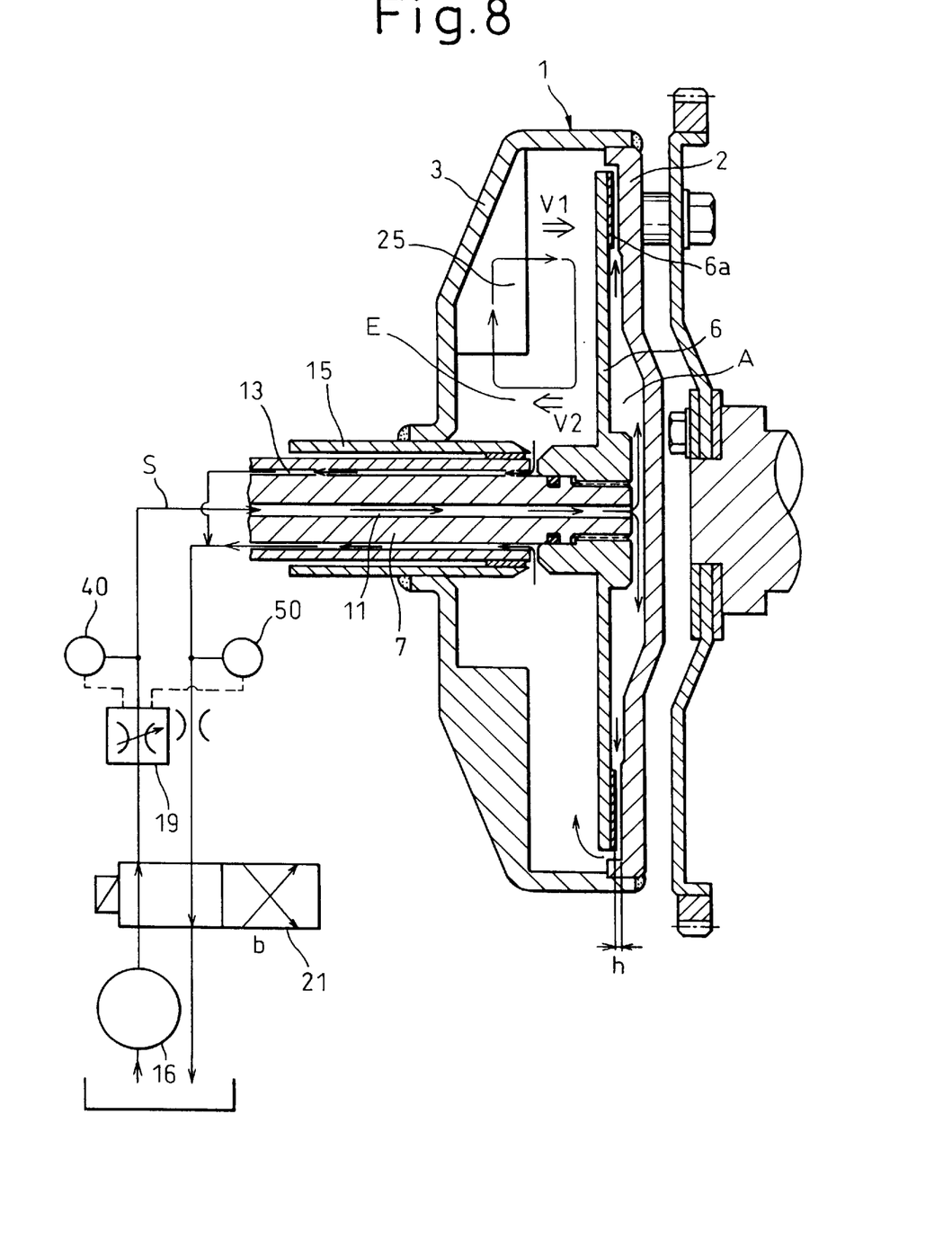
FIG. 8 is a view showing a construction of the fourth embodiment.

FIG. 8 is a view showing a construction of the fourth embodiment. On the rear side of the clutch disk 6, there are provided no spring and piston, but there is formed a large hydraulic fluid chamber E, in which a plurality of blades 25, which are blade members, are attached to the inside of the hydraulic fluid chamber E.

Due the above construction, when the blades 25 are rotated, they act as an axial flow pump, so that hydraulic pressure is applied to the clutch disk 6. By this hydraulic pressure, the clutch disk 6 is pushed toward the front cover 2.

In this case, the blades 25 generate an axial flow, the flow rate of which is Q, and the velocity of which is V1. This axial flow collides with the rear surface of the clutch disk 6, and the velocity is changed to V2. In the above operating condition, the following force F acts on the clutch disk 6.

$$F = \rho Q(|V1| - |V2|)$$

where ρ=is density

The clutch disk 6 is engaged with the front cover 2 by the above force.

With respect to the above force, a quantity of hydraulic fluid fed into the hydraulic fluid chamber A is adjusted as follows. A difference between the pressure in the hydraulic fluid passage 11 communicated with the hydraulic fluid chamber A and the pressure in the hydraulic fluid passage 13 communicated with the hydraulic fluid chamber E is measured, and the thickness of a film of oil is controlled in accordance with the pressure difference, that is, the variable aperture 19 is adjusted. Consequently, in the same manner as that of the second and the third embodiment, the pressure gauges 40, 50 are arranged in this embodiment.

The variable aperture 19 is incorporated into this hydraulic pressure circuit in series. Therefore, the flow rate can be directly controlled.

In this embodiment, the same changeover valve 21 as that used in the second embodiment is used. Therefore, when the changeover valve is set in the state "b", it is possible to provide a higher engaging force than that provided in the state "a".

As described above, the fourth embodiment is characterized as follows. It is unnecessary to provide a piston. Further, the thrust F generated by the axial flow is changed in accordance with the engine speed. Therefore, when the engine speed is increased, the thrust is increased in accordance with the engine speed, and the transmission torque is also increased. In this way, the transmission torque is automatically adjusted.

Figure 9:
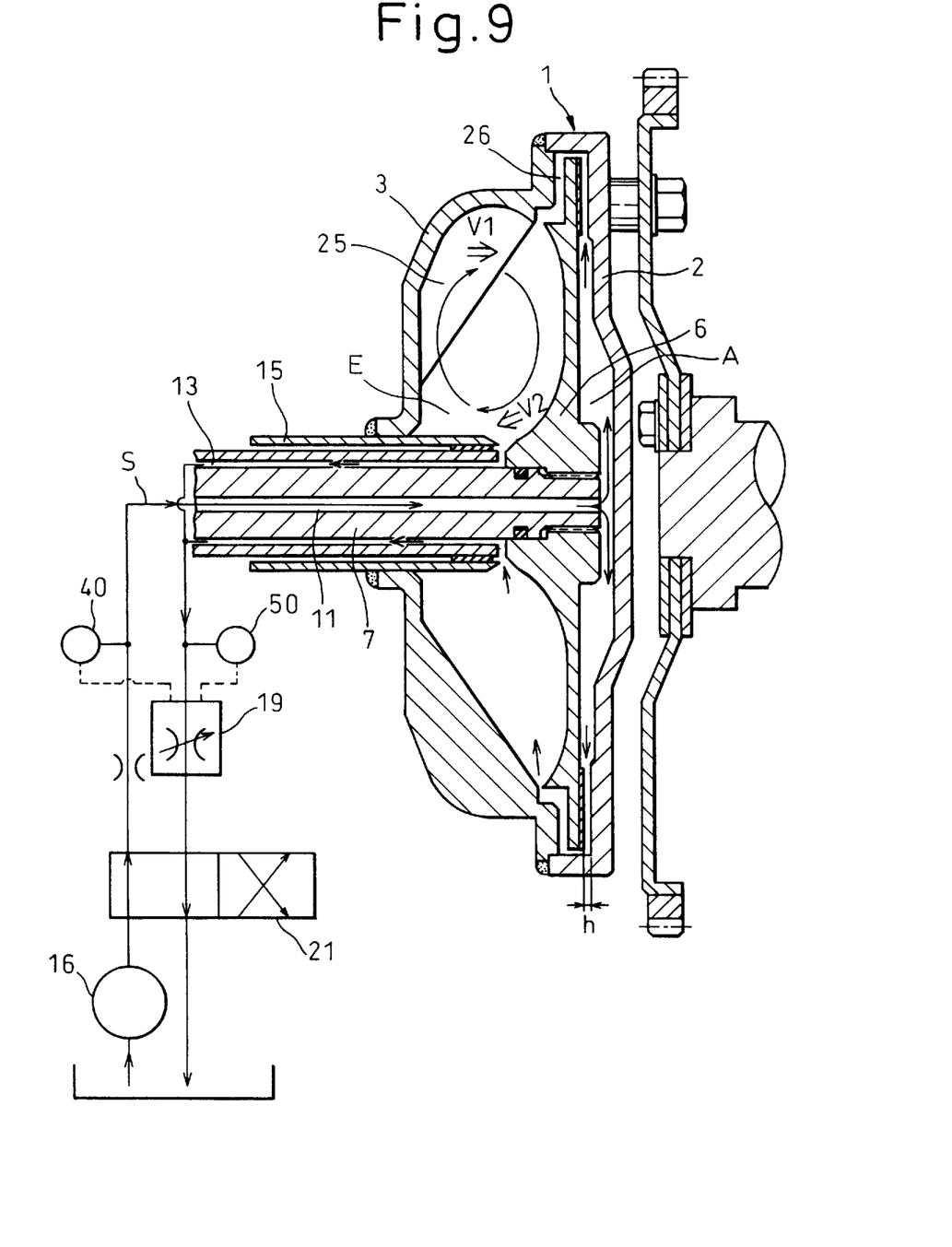
FIG. 9 is a view showing a construction of the wet type friction of a variation of the fourth embodiment.

FIG. 9 is a view showing a variation of the fourth embodiment. In this embodiment, in order to smooth out an axial flow of hydraulic fluid flowing to the clutch disk 6 and reduce a loss in pressure, an inner surface of the rear cover on the outer circumferential side and a rear surface of the clutch disk 6, which is a side of the clutch disk 6 to receive the axial flow of hydraulic fluid, are formed to be circular.

Due to the above construction, the pressure loss can be reduced. Accordingly, in the expression F=ρQ(V1−V2), the value of V2 becomes higher than that of the fourth embodiment shown in FIG. 8. Therefore, the value of F is determined by the following expression.

$$F = \rho Q(|V1| + |V2|)$$

That is, it is possible to obtain a force higher than that of the fourth embodiment.

When a dynamic pressure of the axial flow of hydraulic fluid is transmitted into a space between the clutch disk 6 and the front cover 2 via a clearance formed on the outer circumference of the clutch disk 6, distortion is caused in the clearance "h". In order to prevent the above distortion of the clearance "h", a labyrinth seal 26 is incorporated into a passage connecting a space between the clutch disk 6 and the front cover 2 with a space in which the axial flow of hydraulic fluid is generated. Further, a distance from the rotation center to a portion where the labyrinth seal 26 is connected to the space formed between the clutch disk 6 and the front cover 2 is made to be smaller than a distance from the rotation center to a portion where the labyrinth seal 26 is connected to the space where the axial flow of hydraulic fluid is generated.

Since the variable aperture 19 is arranged on the delivery side, the inner pressure is not lowered, so that the occurrence of cavitation can be prevented.

According to the present invention, hydraulic fluid is fed onto friction surfaces of a pair of friction plates opposed to each other so that they can be engaged with, semi-engaged with and disengaged from each other. Therefore, since hydraulic fluid is provided between the friction plates even in a state of semi-engagement, it is possible to prevent the occurrence of judder of a clutch.

When a clearance between the friction plates is controlled, a period of time required for the engagement of friction plates can be controlled. Accordingly, the response of friction plate engaging control can be stabilized.

I claim:

1. A wet type frictional engagement device comprising: a first member connected to a power generating means; a second member arranged on the same axis as that of the first member, rotated relatively to the first member; a pair of friction plates respectively connected to the above two members, arranged so that the pair of friction plates can be frictionally engaged with each other; a pushing means for pushing at least one of the pair of friction plates against the other so that the pair of friction plates can be frictionally engaged with each other; and a hydraulic fluid feed means for feeding hydraulic fluid between the pair of friction plates frictionally engaged with each other by the pushing means at a flow rate so as to change a distance between the pair of friction plates and thereby control the transmission of power.

2. A wet type frictional engagement device according to claim 1, wherein the pushing means is composed of a spring member.

3. A wet type frictional engagement device according to claim 1, wherein the pushing means is composed of a hydraulic pushing means.

4. A wet type frictional engagement device according to claim 1, wherein the pushing means pushes a friction plate connected to the second member.

5. A wet type frictional engagement device according to claim 4, wherein the pushing means is a hydraulic thrust generating means for generating an axial thrust on a rear side of the friction plate connected to the second member, and the rear side of the friction plate is not frictionally engaged with another friction plate.

6. A wet type frictional engagement device according to claim 5, wherein the hydraulic thrust generating means is a blade member attached to a shell member rotated by the motive power generating means, and the shell member is connected to the friction plate connected to the first member.

7. A wet type frictional engagement device according to claim 6, wherein curved guide surfaces to make hydraulic fluid flow smoothly for enhancing the axial thrust generating efficiency of the hydraulic thrust generating means are formed on the shell member and the rear side of the friction plate connected with the second member, and the rear side of the friction plate is not frictionally engaged with another friction plate.

8. A wet type frictional engagement device according to one of claims 5 to 7, further comprising a restricting means for restricting the fluid used for generating the axial thrust so that it can not get onto the frictional engaging surface.

* * * * *